United States Patent
Singh

(10) Patent No.: US 12,418,509 B2
(45) Date of Patent: *Sep. 16, 2025

(54) SYSTEM AND METHOD FOR UPDATING A FIREWALL SECURITY CONFIGURATION IN A DECENTRALIZED NETWORK

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 279 days.

This patent is subject to a terminal disclaimer.

(21) Appl. No.: 18/311,811

(22) Filed: May 3, 2023

(65) Prior Publication Data
US 2024/0372833 A1 Nov. 7, 2024

(51) Int. Cl.
*H04L 9/40* (2022.01)

(52) U.S. Cl.
CPC ........ *H04L 63/0263* (2013.01); *H04L 63/102* (2013.01)

(58) Field of Classification Search
CPC ........... G16H 40/20; H04L 9/50; H04L 63/20; H04L 63/102; H04L 63/0227; H04L 63/0245; H04L 63/0263; H04L 63/0272; H04L 67/535; H04L 63/1441; G06Q 30/0277; G06F 21/31

See application file for complete search history.

(56) References Cited

U.S. PATENT DOCUMENTS

| | | | |
|---|---|---|---|
| 5,968,176 A * | 10/1999 | Nessett | H04L 63/0227 726/11 |
| 7,441,262 B2 | 10/2008 | Hui et al. | |
| 8,228,861 B1 | 7/2012 | Nix | |
| 8,353,021 B1 * | 1/2013 | Satish | H04L 63/0263 709/202 |
| 8,468,244 B2 | 6/2013 | Redlich et al. | |
| 8,498,941 B2 | 7/2013 | Felsher | |
| 8,566,115 B2 | 10/2013 | Moore | |
| 8,843,997 B1 | 9/2014 | Hare | |

(Continued)

OTHER PUBLICATIONS

Singh, Shailendra, System and method for dynamically aggregating multiple firewall security configurations in a decentralized network, U.S. Appl. No. 18/311,791, filed May 3, 2023.

*Primary Examiner* — Dustin Nguyen

(57) ABSTRACT

An apparatus may comprise a memory communicatively coupled to a processor. The memory may be configured to store user profiles and security information. The processor may be configured to receive a device profile from a user device. Further, the processor may be configured to validate the device profile against a user profile; determine an entitlement associated with the user profile; generate an initial token indicating that the device profile is entitled to access the entitlement; transmit the initial token to a decentralized network; and receive an updated token from the decentralized network. The updated token may indicate a firewall configuration based at least in part upon the initial token. The firewall configuration may be configured to enable the user device to access the entitlement. The processor may be configured to transmit the firewall configuration to the user device to implement a firewall at the user device.

20 Claims, 4 Drawing Sheets

(56) References Cited

U.S. PATENT DOCUMENTS

| | | | |
|---|---|---|---|
| 9,026,079 B2 | 5/2015 | Raleigh et al. | |
| 9,419,951 B1 | 8/2016 | Felsher et al. | |
| 10,474,660 B2 | 11/2019 | Ariel et al. | |
| 10,523,657 B2 | 12/2019 | Reddy et al. | |
| 10,785,190 B2 | 9/2020 | Saavedra et al. | |
| 10,798,165 B2 | 10/2020 | Srinivasan et al. | |
| 10,805,332 B2 | 10/2020 | Gunda et al. | |
| 10,880,270 B1 | 12/2020 | Rigor et al. | |
| 11,165,800 B2 | 11/2021 | Thampy | |
| 11,232,125 B1 | 1/2022 | Khante et al. | |
| 11,515,032 B2 | 11/2022 | Dormer et al. | |
| 11,575,693 B1 | 2/2023 | Muddu et al. | |
| 2002/0166068 A1* | 11/2002 | Kilgore | H04L 63/102 726/4 |
| 2004/0205101 A1* | 10/2004 | Radhakrishnan | G06Q 30/0277 709/200 |
| 2007/0234408 A1* | 10/2007 | Burch | G06F 21/31 726/6 |
| 2008/0235755 A1* | 9/2008 | Blaisdell | H04L 63/102 726/1 |
| 2008/0282336 A1* | 11/2008 | Diaz Cuellar | H04L 63/20 726/11 |
| 2016/0099917 A1* | 4/2016 | Glazemakers | H04L 63/0272 726/12 |
| 2017/0251013 A1* | 8/2017 | Kirti | H04L 63/1441 |
| 2018/0013722 A1* | 1/2018 | Enos | G16H 40/20 |
| 2018/0131675 A1* | 5/2018 | Sengupta | H04L 63/0245 |
| 2018/0332063 A1* | 11/2018 | Ford | H04L 67/535 |
| 2020/0267138 A1* | 8/2020 | Irwan | H04L 9/50 |
| 2022/0030009 A1 | 1/2022 | Hasan | |
| 2022/0084087 A1 | 3/2022 | Chapman | |

\* cited by examiner

SYSTEM AND METHOD FOR UPDATING A FIREWALL SECURITY CONFIGURATION IN A DECENTRALIZED NETWORK

TECHNICAL FIELD

The present disclosure relates generally to operation of a system configured to provide a firewall security configuration, and more specifically to a system and method to update a firewall security configuration in a decentralized network.

BACKGROUND

In network security, the term vulnerability refers to a possible point of attack where resources may be attempted to be accessed from a network. In some cases, user devices may be targeted by bad actors to exploit vulnerabilities in security systems of the user devices. To defend against these bad actors, network managers may use firewalls to block unauthorized access to the user device while permitting outward communication. Currently, firewalls need to be reviewed, approved, and set up by a specific network manager before a given firewall is set up in a given user device. As such, several hours of work in security-related operations are needed to implement a firewall.

In situations where configuration information for each firewall is prepared for each user device, several user devices may remain vulnerable in an organization or group of user devices for long periods of time while the network manager sets up a firewall for each user device individually.

SUMMARY OF THE DISCLOSURE

Updating A Firewall Security Configuration

In one or more embodiments, a system and a method disclosed herein generate a firewall security configuration in a decentralized network. The firewall security configuration may be one or more configuration commands to implement a firewall at a user device. In one or more embodiments, the method and the system monitor system interactions of a user device, assign a firewall security configuration to the user device based at least in part upon on one or more entitlements corresponding to a user profile associated with the user device, and update the firewall for the user device based at least in part upon changes to the one or more entitlements. To determine the firewall security configuration, the system and the method generate a token representative of the one or more entitlements and provide this token to a decentralized network. In the decentralized network, the token is used to exchange the one or more entitlements to one or more configuration policies and rules corresponding to the entitlements. Once an updated version of the token is received from the decentralized network, the system and the method may extract firewall security information to the user device to be implemented as a firewall at the user device. An improvement provided by using tokens in the decentralized network is that the process of retrieving configuration policies and rules may be automated and may be implemented without the intervention of a network manager while protecting the identity of the user device. The method and the system may update the token to fetch updates to the configuration policies and rules periodically or dynamically every time the system and the method detect a change to the one or more entitlements.

In one or more embodiments, the system and the method described herein are integrated into a practical application of reducing vulnerabilities in a security system, a network, or a group of user devices. In network security, the term vulnerability refers to a possible point of attack where resources may be attempted to be accessed from the network. In some embodiments, the system and the method are configured to prevent bad actors from exploiting vulnerabilities in security systems of the user devices. To defend against these bad actors, the method and the system are integrated into the practical application of reducing work hours for network managers that configure firewalls to block unauthorized access to the user device while permitting outward communication. In one or more embodiments, the firewalls implemented based at least in part upon the firewall configuration do not need to be reviewed, approved, and set up by any network managers before a given firewall is set up in a given user device. In this regard, several hours of work in security-related operations are reduced or eliminated while implementing a user firewall.

In one or more embodiments, the system and the method described herein are integrated into a practical application of reducing or preventing network security challenges by reducing a possibility of malicious attacks caused by vulnerabilities in the security network. In this regard, the system and the method are integrated into a practical application of upgrading the firewall configuration to implement the firewall in the user device. As a result, the firewall does not need to be approved by network managers or security personnel before the firewall is implemented in the user device. In some embodiments, the system and the method improve operations where configuration information for each firewall is prepared for each user device by acknowledging new possible vulnerabilities, creating tokens to safeguard access to user entitlements via the new possible vulnerabilities, and updating the firewall of the user device to defend against the new possible vulnerabilities. In this regard, safeguarding against the new possible vulnerabilities may refer to updating the firewall of the user device to account for a change in the corresponding user entitlements.

In some embodiments, the system and the method are integrated into a practical application of improving data security by protecting sensitive information associated with a user operating the user device. In particular, the system and the method reduce or eliminate any access from the nodes in the decentralized network to the sensitive information because the initial token comprises initial encrypted firewall configuration that only allows the nodes to identify any entitlements associated with a given user profile. At this stage, the system and method described herein provide updated tokens to the server comprising updated encrypted firewall configuration that the server parses to assign updates to the firewall configuration of the firewall at the user device. As a non-limiting example of technical solutions involving this practical application, the system and the method may identify that a user attempts to access a network resource and generates an update to the firewall such that the user device is enabled to access the network resource with protection against any new possible vulnerabilities without requiring review and approval from security personnel. In turn, security personnel may update the rules and policies at the nodes of the decentralized network, which ensures that the system and the method receive updated tokens updated in accordance with newer security information.

In one or more embodiments, the system and method are directed to improvements in computer systems. Specifically, the system and the method reduce processor and memory usage in user devices by preventing or eliminating queues in a central location in a network. Further, the system and the method reduce the possibility of downtime in the updated firewalls by providing updated tokens via nodes in a decentralized network. In particular, the nodes may be updated individually and may be located at different locations such that rules and policies associated with all security information for an organization is not in a same location. Instead, the system and the method enable nodes located at different locations to provide updated information to the server, generate backups of one another, and remain available for the server to request updated tokens even if one of the node is interrupted or irresponsive. Substantial processing capacity, memory usage, and power consumption is prevented by providing defenses for interactions accessing resources in the network. Another technical solution involves eliminating potential threats dynamically for a given user device.

In one or more embodiments, the system and the method may be performed by an apparatus, such as the server, communicatively coupled to one or more user devices and one or more decentralized networks. Further, the system may be a security system, that comprises the apparatus. In addition, the system and the method may be performed as part of a process performed by the apparatus communicatively coupled to the one or more user devices and the one or more decentralized networks. As a non-limiting example, the apparatus may comprise a memory and a processor communicatively coupled to one another. The memory may be configured to store one or more user profiles associated with one or more user groups and security information comprising one or more firewall configurations. Each user profile may comprise one or more entitlements. Each firewall configuration may be configured to enable each user profile to access the one or more entitlements. The processor may be configured to receive a first device profile from a first user device; validate the first device profile against a first user profile of the one or more user profiles; and determine a first entitlement of the one or more entitlements associated with the first user profile. Further, the processor may be configured to generate a first initial token indicating that the first device profile is entitled to access the first entitlement; transmit the first initial token to a decentralized network; and receive a first updated token from the decentralized network. The first updated token may indicate a first firewall configuration based at least in part upon the first initial token. The first firewall configuration may be configured to enable the first user device to access the first entitlement. Then, the processor may be configured to transmit the first firewall configuration to the first user device to implement a first firewall at the first user device.

Dynamically Aggregating Multiple Firewall Security Configurations

In one or more embodiments, the system and the method disclosed herein dynamically aggregate multiple firewall security configurations in a decentralized network. The firewall security configurations may be configuration commands to implement firewalls at multiple user devices. In one or more embodiments, the method and the system monitor and aggregate multiple tokens of multiple user devices in a group or organization. Each token may be representative of entitlements associated with a user device in the group or organization. In the decentralized network, the token is used to exchange the one or more entitlements to one or more configuration policies and rules corresponding to the entitlements. In some embodiments, the method and the system may parse each token generated for a user device in the group or organization; identify differences among the tokens in the group or organization; and dynamically update the tokens of user devices in the group or organization that include fewer entitlements in their corresponding tokens. An improvement provided by the system and the method is that multiple tokens in a group or organization may be dynamically updated to include the entitlements approved for multiple user devices in the group or organization.

In one or more embodiments, the system and the method described herein are integrated into a practical application of dynamically reduce vulnerabilities in a security system, a network, or a group of user devices. As described above, in network security, the term vulnerability refers to a possible point of attack where resources may be attempted to be accessed from the network. In some embodiments, the system and the method are configured to prevent bad actors from exploiting vulnerabilities in security systems of a group of user devices. To defend against these bad actors, the method and the system are integrated into the practical application of reducing work hours for network managers that configure firewalls to block unauthorized access to the group of user devices while permitting outward communication. In one or more embodiments, the firewalls implemented based at least in part upon the firewall configuration do not need to be reviewed, approved, and set up by any network managers for an entire group of user devices before firewalls are set up in a given group of user device. In this regard, several hours of work in security-related operations are reduced or eliminated while implementing a group firewall.

In one or more embodiments, the system and the method described herein are integrated into a practical application of reducing or preventing network security challenges by reducing a possibility of malicious attacks caused by vulnerabilities in the security network. In this regard, the system and the method are integrated into a practical application of dynamically aggregating multiple firewall security configurations to implement the firewalls in a given group comprising the user devices. As a result, the firewalls do not need to be approved by network managers or security personnel before the firewalls are aggregated and implemented at each user device in the group. In some embodiments, the system and the method improve operations where configuration information for each firewall is prepared for a group of user devices by acknowledging new possible vulnerabilities, creating tokens to safeguard access to user entitlements via the new possible vulnerabilities, dynamically aggregating tokens for multiple user devices in a group, and updating the firewall of the user device to defend against the new possible vulnerabilities. In this regard, safeguarding against the new possible vulnerabilities may refer to updating the firewall of the group of user devices to account for multiple individual changes in the corresponding user entitlements at each user device.

In some embodiments, the system and the method are integrated into a practical application of improving data security by protecting sensitive information associated with any users operating the group of user devices. In particular, the system and the method reduce or eliminate any access from the nodes in the decentralized network to the sensitive information because the initial token comprises initial encrypted firewall configuration that only allows the nodes to identify any entitlements associated with multiple user profiles. At this stage, the system and method described herein provide updated tokens to the server comprising updated encrypted firewall configuration that the server parses to assign updates to the firewall configuration of the firewall at the user devices in the group. As a non-limiting example of technical solutions involving this practical application, the system and the method may identify that a user in the group attempts to access a network resource and generates an update to the collective firewall such that the user devices in the group are enabled to access the network resource with protection against any new possible vulnerabilities without requiring review and approval from security personnel. In turn, security personnel may update the rules and policies at the nodes of the decentralized network, which ensures that the system and the method receive updated tokens updated in accordance with newer security information.

In one or more embodiments, the system and method are directed to improvements in computer systems. Specifically, the system and the method reduce processor and memory usage in the user devices of a given group by preventing or eliminating queues in a central location in a network. Further, the system and the method reduce the possibility of downtime in the updated firewalls by providing aggregated updated tokens via nodes in a decentralized network. In particular, the nodes may be updated individually and may be located at different locations such that rules and policies associated with all security information for an organization is not in a same location. Instead, the system and the method enable nodes located at different locations to provide updated information to the server, generate backups of one another, and remain available for the server to request updated tokens even if one of the node is interrupted or irresponsive. Substantial processing capacity, memory usage, and power consumption is prevented by dynamically providing defenses for interactions accessing resources in the network. Another technical solution involves eliminating potential threats dynamically for a given group of user devices.

In one or more embodiments, the system and the method may be performed by an apparatus, such as the server, communicatively coupled to one or more user devices and one or more decentralized networks. Further, the system may be a security system, that comprises the apparatus. In addition, the system and the method may be performed as part of a process performed by the apparatus communicatively coupled to the one or more user devices and the one or more decentralized networks. As a non-limiting example, the apparatus may comprise a memory and a processor communicatively coupled to one another. The memory may be configured to store one or more user profiles associated with one or more user groups, security information comprising one or more firewall configurations, and one or more updated tokens associated with one or more of the user profiles. Each user profile may comprise one or more entitlements. Each firewall configuration may be configured to enable each user profile to access the one or more entitlements. Each updated token may indicate a firewall configuration configured to enable a corresponding user device to access an entitlement of the one or more entitlements. The processor may be configured to identify a first updated token of the one or more updated tokens that is associated with a first user profile of the one or more user profiles; and determine a first entitlement of the one or more entitlements associated with the first user profile. The first user profile may be associated with a first user group of the one or more user groups. Further, the processor may be configured to identify a second updated token of the one or more updated tokens that is associated with a second user profile of the one or more user profiles; and determine a second entitlement of the one or more entitlements associated with the second user profile. The second user profile may be associated with the first user group of the one or more user groups. Then, the processor may be configured to determine a second entitlement of the one or more entitlements associated with the second user profile; generate a first initial token indicating that the first user group is entitled to access the first entitlement and the second entitlement; transmit the first initial token to a decentralized network; and receive a third updated token from the decentralized network. The third updated token may indicate a first firewall configuration based at least in part upon the first initial token. The first firewall configuration may be configured to enable a first user device associated with the first user profile and a second user device associated with the second user profile to access the first entitlement and the second entitlement. In this regard, the processor is configured to transmit the first firewall configuration to the first user device and the second user device to implement a first firewall at the first user device and at the second user device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
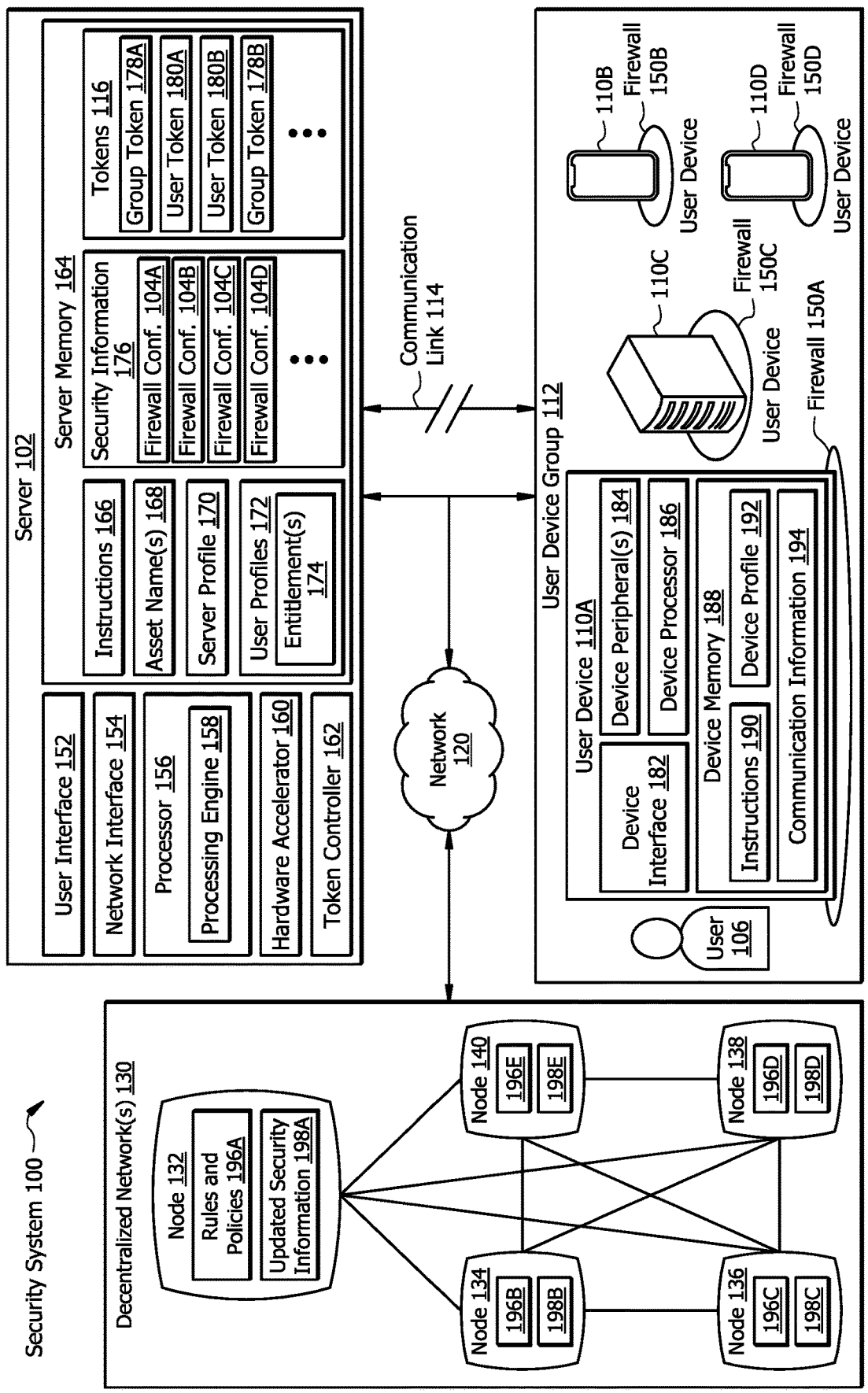
FIG. 1 illustrates an example security system in accordance with one or more embodiments.
Figure 2:
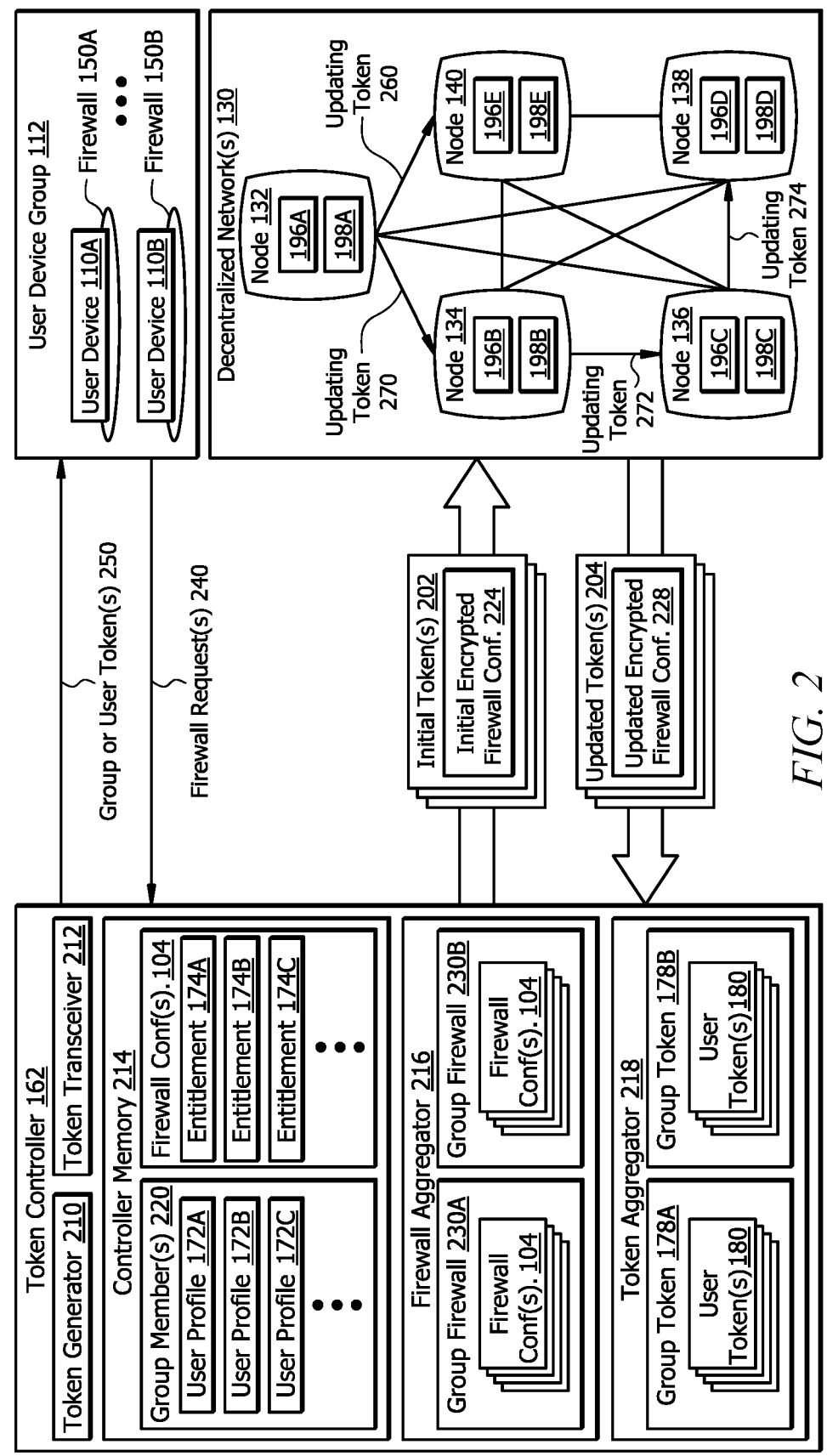
FIG. 2 illustrates example security operations performed by the security system of FIG. 1 in accordance with one or more embodiments.
Figure 3:
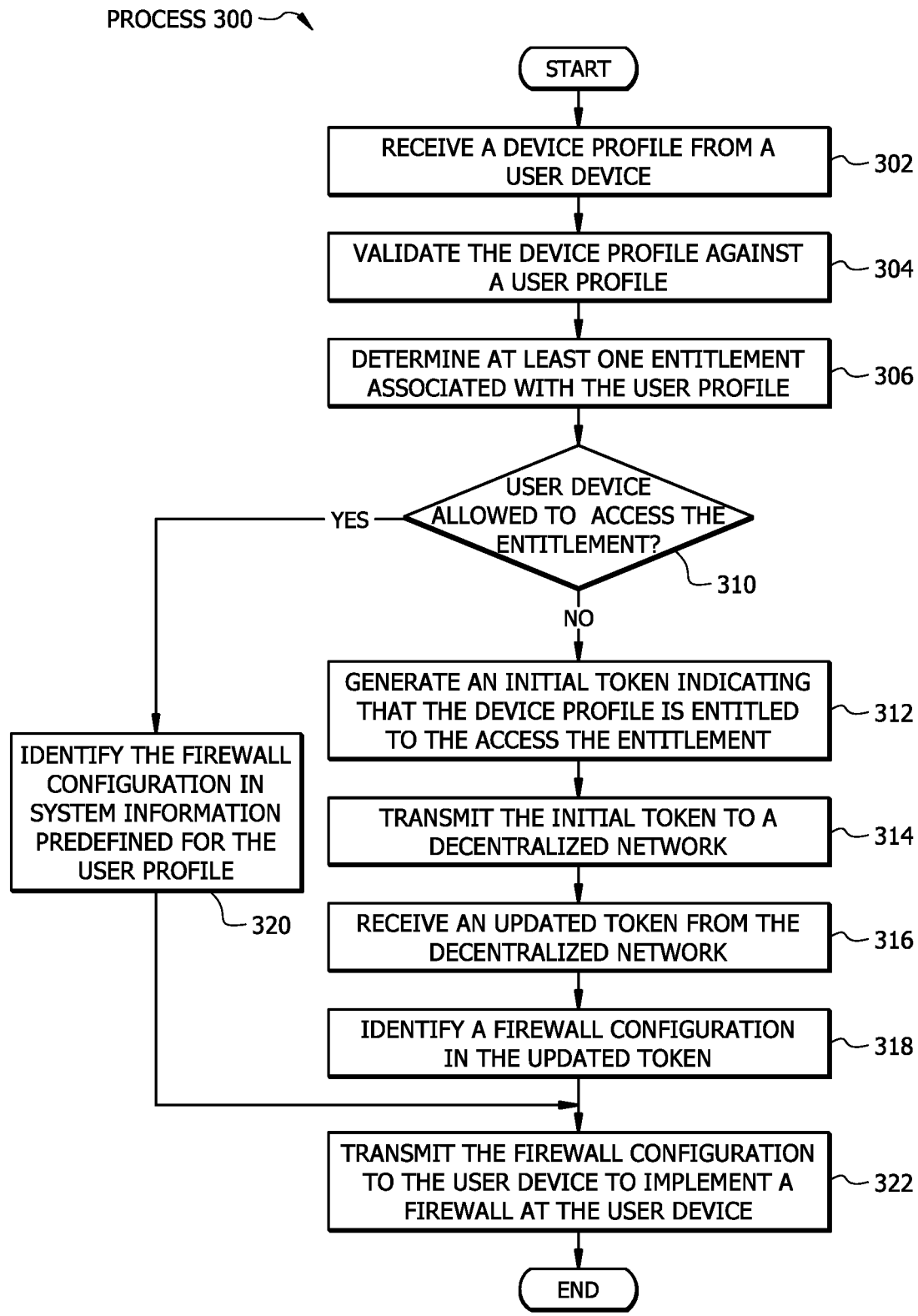
FIG. 3 illustrates an example flowchart of a method to update a firewall security configuration in accordance with one or more embodiments.
Figure 4:
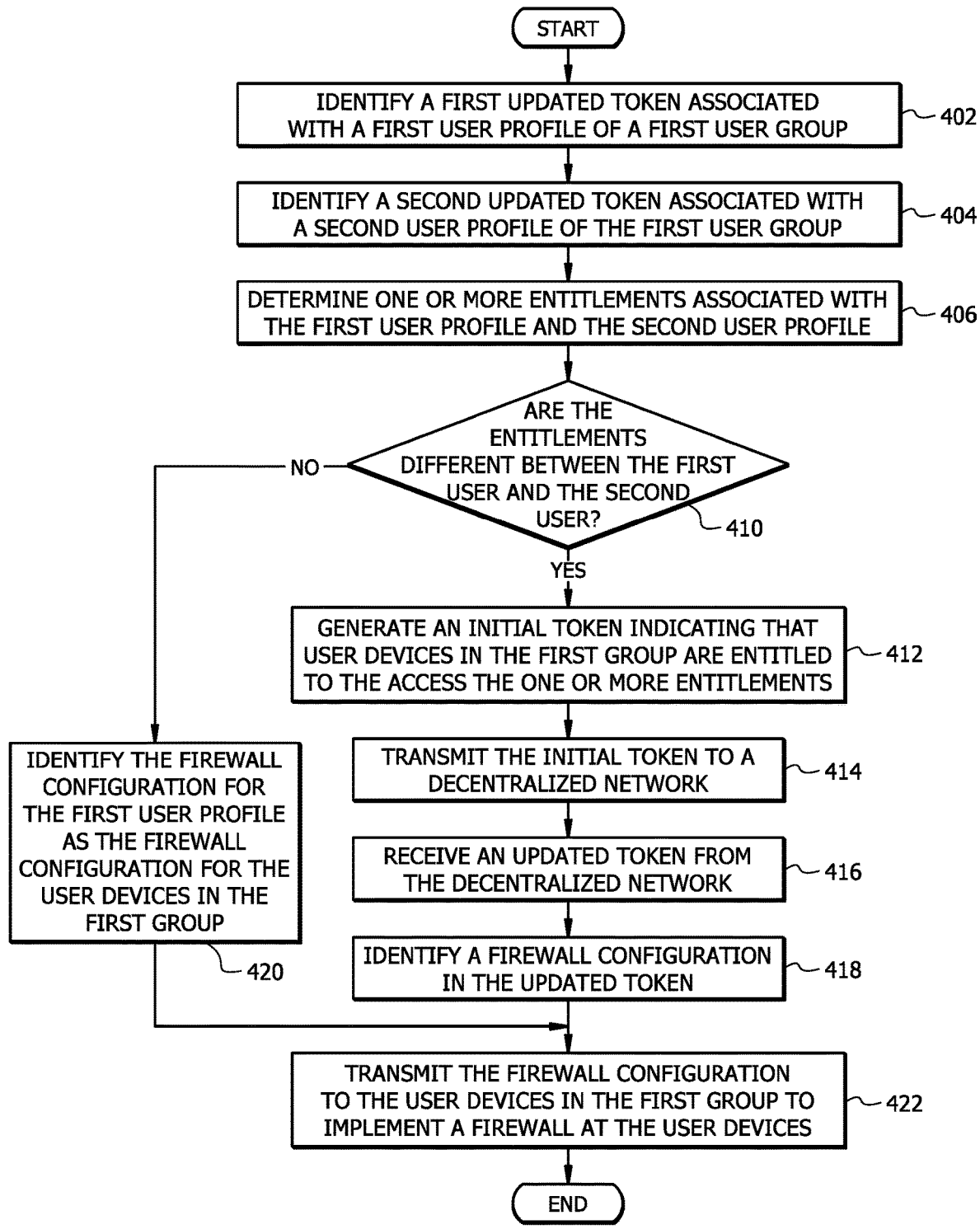
FIG. 4 illustrates an example flowchart of a method to aggregate multiple firewall security configurations in accordance with one or more embodiments.

As described above, this disclosure provides various systems and methods to update a firewall security configuration for a user device in a decentralized network. Further, this disclosure provides various systems and methods to dynamically aggregate multiple firewall security configurations for user devices in a user device group. FIG. 1 illustrates a security system 100 in which a server 102 is configured to determine individual or aggregated firewall configurations 104A-104D based at least in part upon monitored operations of one or more user devices 110A-110D in a user device group 112. FIG. 2 illustrates one or more security operations 200 performed by the security system 100 of FIG. 1. FIG. 3 illustrates a first process 300 to perform one or more of the security operations 200 of FIG. 2. FIG. 4 illustrates a second process 400 to perform one or more of the security operations 200 of FIG. 2.

Security System Overview

FIG. 1 illustrates a security system 100 configured to update one or more firewall security configuration in accordance with one or more embodiments. Further, the security system 100 is configured to aggregate multiple firewall security configuration in accordance with one or more embodiments. In the security system 100 of FIG. 1, a server 102 monitors one or more operations performed by one or more users (e.g., user 106) operating one or more user devices 110A-110D in a user device group 112 and identifies at least one operation in a first user device 110A that triggers a request for an updated firewall configuration to the server 102. In FIG. 1, the server 102 is communicatively coupled to multiple user devices 110A-110D via a communication link 114 of via a network 120. While FIG. 1 shows the server 102 connected via the communication link 114 to the entire user device group 112, the server 102 may be communicatively coupled to each of the user devices 110A-110D directly or indirectly via one or more additional electronic devices (e.g., routers, gateways, and the like). Further, the server 102 is communicatively coupled to one or more decentralized networks 130 comprising one or more nodes 132-140. While FIG. 1 shows the server 102 connected via the network 120 to the entire one or more decentralized networks 130, the server 102 may be communicatively coupled to each of the nodes 132-140 directly or indirectly via one or more additional electronic devices (e.g., routers, gateways, and the like).

In one or more embodiments, the server 102 is configured to monitor multiple electronic operations of the user devices 110A-110D over a first predetermined amount of time. In reference to user device 110A as a non-limiting example, the electronic operations may comprise input and output communications received and transmitted by the user device 110A, respectively. The server 102 may be configured to identify an electronic operation that triggers a request to update one or more firewall configurations 104A-104D (collectively, firewall configurations 104) associated with the user device 110A. In one example, a trigger electronic operation may be an attempt by the user device 110A to access a specific network resource (e.g., a website) via the network 120. In another example, the trigger electronic operation may the request by the user device 110A to generate a firewall 150A at the user device 110A. At this stage, in response to determining that the user device 110A is entitled to access the network resources, the server 102 may generate an initial token (one of tokens 116, one of the one or more initial tokens 202 shown in FIG. 2) indicating that the user device 110A is allowed to access the one. In some embodiments, the initial token is transmitted to the one or more decentralized networks 130. In the decentralized networks 130, the nodes 132-140 may update the initial token into an updated token (one of tokens 116, one of the one or more updated tokens 204 of FIG. 2) that is then transmitted to the server 102 comprising updated rules and policies. The server 102 may provide a firewall configuration to the user device 110A based at least in part upon the updated token. The firewall configuration may enable the user device 110A to establish the firewall 150A at the user device 110A comprising a secure (i.e., protected) access to the network resources via the network 120.

In one or more embodiments, the server 102 is configured to monitor multiple electronic operations of the user devices 110A-110D over a second predetermined amount of time. In reference to user device 110A and user device 110B as non-limiting examples, the server 102 may be configured to identify electronic operations that triggers a first request to update one or more firewall configurations 104 associated with the user device 110A and a second request to update one or more firewall configurations 104 associated with the user device 110B. Upon generating a corresponding updated token for the user device 110A and the user device 110B, the server 102 may determine whether the respective firewall configurations 104 indicated by the updated tokens provide secure access to different network resources. If the updated tokens enable secure access to different network resources, the server 102 may aggregate the updated tokens to generate a single updated token. The server 102 may provide the user device 110A and the user device 110B with the single updated token instead of their individual tokens to preemptively enable each of the user device 110A and the user device 110B to securely access each other's network resources via the network 120.

Security System Components

Server

The server 102 is generally any device that is configured to process data and communicate with computing devices (e.g., user devices 110A-110D), databases, systems, and the like, via one or more interfaces (i.e., user interface 152 or network interface 154). The server 102 may comprise a processor 156 that is generally configured to oversee operations of a processing engine 158. The operations of the processing engine 156 are described further below in conjunction with the servicing system 100 described in FIG. 1, the security operations 200 in FIG. 2, process 300 described in FIG. 3, and process 400 described in FIG. 4.

The server 102 comprises the processor 156 communicatively coupled with the user interface 152, the network interface 154, a hardware accelerator 160, a token controller 162, and a memory 164. The server 102 may be configured as shown, or in any other configuration.

The processor 156 comprises one or more processors communicatively coupled to the memory 164. The processor 156 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 156 may be a programmable logic device, a microcontroller, a microprocessor, or any suitable combination of the preceding. The one or more processors 156 are configured to process data and may be implemented in hardware or software executed by hardware. For example, the processor 156 may be 8-bit, 16-bit, 32-bit, 64-bit or of any other suitable architecture. The processor 156 may include an arithmetic logic unit (ALU) for performing arithmetic and logic operations, processor registers that supply operands to the ALU and store the results of ALU operations, and a control unit that fetches instructions 166 from the memory 164 and executes them by directing the coordinated operations of the ALU, registers and other components. In this regard, the one or more processors 156 are configured to execute various instructions. For example, the one or more processors 156 are configured to execute the instructions 166 to implement the functions disclosed herein, such as some or all of those described with respect to FIGS. 1-4. In some embodiments, the functions described herein are implemented using logic units, FPGAs, ASICs, DSPs, or any other suitable hardware or electronic circuitry.

In one or more embodiments, the user interface 152 and the network interface 154 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The user interface 152 and the network interface 154 may be configured to support any suitable type of communication protocol as would be appreciated by one of ordinary skill in the art.

In one or more embodiments, the user interface 152 and the network interface 154 may be configured to enable wired and/or wireless communications. The user interface 152 and the network interface 154 may be configured to communicate data between the server 102 and other user devices (i.e., the user devices 110A-110D), network devices (i.e., the decentralized networks 130), systems, or domain(s) via the network 120. For example, the network interface 154 may comprise a WIFI interface, a LAN interface, a WAN interface, a modem, a switch, or a router. The processor 156 may be configured to send and receive data using the user interface 152 and the network interface 154. The user interface 152 and the network interface 156 may be configured to use any suitable type of communication protocol. In some embodiments, the communication protocols may be protocols configured in accordance with the non-fungible token (NFT) processing and aggregating of the EIP-3664 standard. In the EIP-3664 standard, tokens may be aggregated or grouped based at least upon common characteristics, such as general changeability, transferability, upgradeability, and evolvable attributes.

In some embodiments, the hardware accelerator 160 may be any combination of a processing accelerator, signal processing circuitry (e.g., including filters, mixers, oscillators, amplifiers, and the like), or digital processing circuitry (e.g., for digital modulation as well as other digital processing). For example, the hardware accelerator 160 may be configured to allocate power, processing, and memory resources during updates of firewall configurations and during dynamic aggregation of firewall configurations.

In one or more embodiments, the token controller 162 is configured to create, analyze, manage, and update one or more tokens 116. The token controller 162 may be configured to communicate with the one or more decentralized networks 130 via the network interface 154 and the network 120. The token controller 162 may be configured to perform one or more of the security operations 200 described below in reference to FIG. 2. In some embodiments, the token controller 162 may be configured to update one or more of the firewall configurations 104 in the security information 176. In other embodiments, the token controller 162 may be configured to aggregate updated tokens of multiple user devices 110 and obtain a new updated token from the decentralized networks 130 representing an aggregated firewall configuration 104. In this regard, the token controller 162 may generate user tokens 180 when an updated token is configured to provide a firewall configuration 104 to be implemented as a firewall 150 at one or more of the user devices 110. In yet other embodiments, the token controller 162 may generate group tokens 178 when an updated token is configured to provide a firewall configuration 104 to be implemented as one or more firewalls 150 at one or more the user devices 110 in a user device group 112.

The memory 164 may be volatile or non-volatile and may comprise a read-only memory (ROM), random-access memory (RAM), ternary content-addressable memory (TCAM), dynamic random-access memory (DRAM), and static random-access memory (SRAM). The memory 164 may be implemented using one or more disks, tape drives, solid-state drives, and/or the like. The memory 164 is operable to store the instructions 166, multiple asset names 168 corresponding to names of one or more of the user devices 110, a server profile 170, one or more user profiles 172 corresponding to one or more users (e.g., user 106) of the user devices 110 and comprising one or more entitlements 174 for each user profile, security information 176 comprising the firewall configurations 104, one or more tokens 177 comprising group tokens 178A and 178B (collectively, group tokens 178) and one or more user tokens 180A and 180B (collectively, group tokens 180), and/or any other data or instructions. The instructions 166 may comprise any suitable set of instructions, logic, rules, or code operable to execute the processor 156.

In one or more embodiments, the asset names 168 may be the names of the user devices 110 in a given user device group 112. The asset names may be a string of numbers, alphanumeric characters, one or more words or phrases, one or more letters, and/or symbols. In some embodiments, the server profile 170 may be a profile of the server 102 that is representative of one or more entitlements of the server 102 within an organization. For example, an organization may include multiple versions of the server 102 comprising different levels of clearance or access to network resources. In the example of FIG. 1, the server profile 170 may indicate that the server 102 is entitled to operate the token controller 162 and perform one or more of the security operations described in reference to FIG. 2 in relation to the processor 156 and/or the token controller 162.

In one or more embodiments, the user profiles 172 may comprise multiple profiles for users (e.g., user 106). Each user profile may comprise one or more entitlements 174. As described above, the entitlements 174 may indicate that a given user is allowed to access one or more network resources in accordance with one or more rules and policies 196A-196E (collectively, rules and policies 196). The entitlements 174 may indicate that a given user is allowed to perform one or more operations in the network 120 (e.g., access a specific website on the Internet). To secure or protect operations of the user devices 110 from bad actors, the entitlements may be assigned to a given user profile 172 in accordance with updated security information 198A-198E (collectively, security information 198), which may provide guidance parameters to the use of the entitlements 174 based at least upon corresponding rules and policies 196.

In one or more embodiments, the security information 176 comprises one or more firewall configurations 104. In FIG. 1, the security information 176 comprises the firewall configuration 104A, the firewall configuration 104B, the firewall configuration 104C, and the firewall configuration 104D. In some embodiments, the security information may comprise more or less firewall configurations 104 than those showed in FIG. 1. As described above, the security information 176 may be established configuration parameters to implement a firewall 150 at a given user device 110. In this regard, each firewall configuration 104 comprises one or more instructions for implementing the firewalls 150.

In one or more embodiments, the tokens 116 are comprise the group tokens 178 and the user tokens 180. The group tokens 178 may be configured to provide one or more firewall configurations 104 from the security information 176 to implement a firewall 150 at multiple user devices 110. For example, the user device group 112 may receive the group token 178A from the server 102 indicating that the aggregated updated tokens corresponding to the user devices 110A-110D. The user tokens 180 may be configured to provide one or more firewall configurations 104 from the security information 176 to implement a firewall 150 at least one user device 110. For example, the user device 110A in the user device group 112 may receive the user token 180A from the server 102 indicating that the updated token corresponding to the user device 110A.

Network

The network 120 facilitates communication between and amongst the various devices of the security system 100. The network 120 may be any suitable network operable to facilitate communication between the server 102, the one or more decentralized networks 130, and the user devices 110 of the security system 100. The network 120 may include any interconnecting system capable of transmitting audio, video, signals, data, data packets (e.g., non-fungible tokens (NFT)), messages, or any combination of the preceding. The network 120 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Device

In one or more embodiments, each of the user devices 110 (e.g., the user devices 110A-110D) may be any computing device configured to communicate with other devices, such as the server 102, other user devices 110 in the user device group 112, databases, and the like in the security system 100. Each of the user devices 110 may be configured to perform specific functions described herein and interact with one or more user devices 110A-110D in the user device group 112. Examples of user device 110 comprise, but are not limited to, a laptop, a computer, a smartphone, a tablet, a smart device, an IoT device, a simulated reality device, an augmented reality device, or any other suitable type of device.

The user devices 110 may be hardware configured to create, transmit, and/or receive information. The user devices 110 may be configured to receive inputs from a user, process the inputs, and generate data information or command information in response. The data information may include documents or files generated using a graphical user interface (GUI). The command information may include input selections/commands triggered by a user using a peripheral component or one or more device peripherals 184 (i.e., a keyboard) or an integrated input system (i.e., a touchscreen displaying the GUI). The user devices 110 may be communicatively coupled to the server 102 via a network connection (i.e., user interface 152 in the server 102). The user devices 110 may transmit and receive data information, command information, or a combination of both to and from the server 102 via the user interface 152. In one or more embodiments, the user devices 110 is configured to exchange data, commands, and signaling with the server 102 via the communication link 114. In some embodiments, the user devices 110 are configured to receive at least one firewall configuration from the server 102 to implement a firewall (one of the firewalls 150) at one of the user devices 110. In other embodiments, the firewalls configurations 104 and the firewalls are explained in further detail below in conjunction with the operational flow of the servicing system 100 described in FIG. 1, the security operations 200 of FIG. 2, the process 300 described in FIG. 3, and the process 400 described in FIG. 4.

In one or more embodiments, while FIG. 1 shows the user device 110A, the user device 110B, the user device 110C, and the user device 110D, the user device group 112 may comprise less or more user devices 110. In FIG. 1, while the firewall 150A is implemented at the user device 110A, the firewall 150B is implemented at the user device 110B, the firewall 150C is implemented at the user device 110A, and the firewall 150A is implemented at the user device 110A, a single firewall 150 may be implemented at two or more user devices 110. For example, in the case of a firewall to be implemented as a result of aggregating firewall configurations 104 for all user devices 110 in the user device group 112, a same firewall 150 may be implemented in the user devices 110A-110D of the user device group 112.

In one or more embodiments, referring to the user device 110A as a non-limiting example of the user devices 110, the user device 110A may comprise a device interface 182, the one or more device peripherals 184, a device processor 186, and a device memory 188. The device interface 182 may be any suitable hardware or software (e.g., executed by hardware) to facilitate any suitable type of communication in wireless or wired connections. These connections may comprise, but not be limited to, all or a portion of network connections coupled to additional user devices 110A-110D in the user device group 112, the server 102, the Internet, an Intranet, a private network, a public network, a peer-to-peer network, the public switched telephone network, a cellular network, a LAN, a MAN, a WAN, and a satellite network. The device interface 182 may be configured to support any suitable type of communication protocol.

In one or more embodiments, the one or more device peripherals 184 may comprise audio devices (e.g., speaker, microphones, and the like), input devices (e.g., keyboard, mouse, and the like), or any suitable electronic component that may provide a modifying or triggering input to the user device 110A. For example, the one or more device peripherals 184 may be speakers configured to release audio signals (e.g., voice signals or commands) during media playback operations. In another example, the one or more device peripherals 184 may be microphones configured to capture audio signals from the user 106. In one or more embodiments, the one or more device peripherals 184 may be configured to operate continuously, at predetermined time periods or intervals, or on-demand.

The device processor 186 may comprise one or more processors communicatively coupled to and in signal communication with the device interface 182, the device peripherals 184, and the device memory 188. The device processor 186 is any electronic circuitry, including, but not limited to, state machines, one or more CPU chips, logic units, cores (e.g., a multi-core processor), FPGAs, ASICs, or DSPs. The UE processor 164 may be a programmable logic device, a microcontroller, a microprocessor, or any suitable combination of the preceding. The one or more processors in the device processor 186 are configured to process data and may be implemented in hardware or software executed by hardware. For example, the device processor 186 may be an 8-bit, a 16-bit, a 32-bit, a 64-bit, or any other suitable architecture. The device processor 186 comprises an ALU to perform arithmetic and logic operations, processor registers that supply operands to the ALU, and store the results of ALU operations, and a control unit that fetches software instructions such as device instructions 190 from the device memory 188 and executes the device instructions 190 by directing the coordinated operations of the ALU, registers, and other components via a device processing engine (not shown). The device processor 186 may be configured to execute various instructions. For example, the device processor 186 may be configured to execute the device instructions 190 to implement functions or perform operations disclosed herein, such as some or all of those described with respect to FIGS. 1-4. In some embodiments, the functions described herein are implemented using logic units, FPGAs, ASICs, DSPs, or any other suitable hardware or electronic circuitry.

Decentralized Network

In one or more embodiments, the decentralized network 130 comprises a peer-to-peer networking protocol that enables development of serverless applications. The decentralized network 130 may include multiple electronic components or devices (i.e., nodes 132-140) comprising specific node data. The nodes 132-140 may not be required to store or validate all data in the decentralized network 130. Instead, validation of each node's data may be obtained via peer accountability. The peer accountability is explained in further detail below in conjunction with the operational flow of the servicing system 100 described in FIG. 1, process 300 described in FIG. 3, and process 400 described in FIG. 4.

In some embodiments, the nodes 132-140 may include only their own data and a reference to all other data in the decentralized network 130 in accordance with rules and policies 196 preestablished by an electronic component or device outside the decentralized network 130 (e.g., one or more servers, such as the server 102). These rules and policies 196 may determine how the nodes 132-140 interact with each other and the server 102. The rules and policies 196 may be updated dynamically or periodically with additional data received as updates via one or more planning components (e.g., electronic devices or components configured to provide updates to the rules and policies 196). The updates may be triggered by a perceived lack of knowledge level in the nodes 132-140. A perceived knowledge level in the nodes 132-140 may be identified via node scores (not shown) received from the server 102 as feedback.

In one or more embodiments, each node (i.e., out of nodes 132-140) in the decentralized network 130 includes knowledge-specific information and information associated with peer accountability and a perceived knowledge level. Specifically, referencing the node 132 as a non-limiting example, includes rules and policies 196A and updated security information 198A. The updated security information 198A may include expert information corresponding to at least one knowledge domain configured to protect operations of one or more user devices 110. In one or more embodiments, the node 132 may be configured to receive one or more of initial tokens. Upon receiving the initial tokens 116, the node 132 may be configured to determine whether any of entitlements 174 of the initial tokens correspond to the knowledge information included in the updated security information 198A.

In other embodiments, the node 132 includes a processor (not shown) configured to provide updates corresponding to specific updated security information 196. The processor in the node 132 may be configured to provide updated tokens directly to the token controller 162. Further, the processor of the node 132 may be configured to route any initial tokens that are not updated to one of the other nodes 134-140 in accordance with one or more rules and policies 194 governing the decentralized network 130.

In the example of FIG. 1, the decentralized network 130 includes five nodes 132-140. However, additional nodes or fewer nodes may be included. In some embodiments, each of the nodes 132-140 includes a corresponding rules and policies 196 and a corresponding security information 198. In the decentralized network 130 of FIG. 1, the node 132 includes the rules and policies 196A and the updated security information 198A; the node 134 includes the rules and policies 196B and the updated security information 198B; the node 136 includes the rules and policies 196C and the updated security information 198C; the node 138 includes the rules and policies 196D and the updated security information 198D; and the node 140 includes the rules and policies 196E and the updated security information 198E.

Operational Flow Overview

FIG. 2 illustrates an example of one or more security operations 200 implemented by the security system 100 of FIG. 1, in accordance with one or more embodiments. While the one or more security operations 200 are shown to be performed by the user devices 110, the token controller 162, and the one or more decentralized networks 130, additional electronic devices or components in the server 102 (e.g., the processor 156 or the hardware accelerator 160) or in a network element (not shown) may be configured to perform one or more of the security operations 200. In the example of FIG. 2, the token controller 114 comprise a token generator 210, a token transceiver 212, a controller memory 214, a firewall aggregator 216, and a token aggregator 218 communicatively coupled to one another.

In one or more embodiments, the token generator 210 is hardware or software (e.g., executed by hardware) configured to generate one or more tokens based at least in part upon one or more characteristics provided by the server 102. In some embodiments, the token generator 210 is configured to mint a token based at least in part upon a decentralized network protocol (e.g., in applications involving blockchain, holochain, and the like). In some embodiments, the token generator 210 shares operations with the processor 156 or the hardware accelerator 160 such that generating a token may be performed by any one or more of these electronic devices or components.

In one or more embodiments, the token transceiver 212 is hardware (e.g., antenna array configured to exchange wireless communications, an analog or digital switchboard configured to exchange wired communications, and the like) or software (e.g., executed by hardware) configured to receive and transmit one or more tokens based at least in part upon one or more conditions indicated by the server 102. In some embodiments, the token transceiver 212 is configured to transmit or receive minted tokens based at least in part upon one of the decentralized network protocol. In some embodiments, the token transceiver 212 shares operations with the user interface 154 and the network interface 154 such that transmitting or receiving a token may be performed by any one or more of these electronic devices or components alone or in combination with one another.

The controller memory 214 comprises one or more group members 220 and one or more firewall configurations 104. The group members 220 may be user profiles 172 that are members of a specific group (e.g., members of the user device group 112). The group members 220 may comprise the user profiles 172 of the server memory 164 shown as user profile 172A, user profile 172B, and user profile 172C, among others. The firewall configurations 104 may comprise secure access to the entitlements 174 of the server memory 164 shown as entitlement 174A, entitlement 174B, and entitlement 174C, among others.

The firewall aggregator 216 may comprise one or more group firewalls 230A and 230B (collectively, group firewalls 230) comprising one or more firewall configurations 104. Each of the firewall configurations 104 may comprise secure or protected access to the one or more entitlements 174. Each firewall configuration 104 may be aggregated to obtain compile multiple firewall configurations 104 associated with a specific user device group 112 in the group firewall 230. The firewall configurations 104 may be different or similar between group firewalls 230.

The token aggregator 218 may comprise one or more of the group tokens 178. In the example of FIG. 2, the token aggregator 218 comprises the group token 178A and the group token 178B. Each of the group tokens 178 may comprise one or more user tokens 180. As described above, each group token 178 may be aggregated to obtain compile multiple firewall configurations associated with a specific user device group 112.

In some embodiments, one or more user devices 110 send one or more firewall requests 240 from the user device group 112 to the token controller 162. The token controller 162 may generate and transmit one or more initial tokens 202 with initial encrypted firewall configuration 250 to the one or more decentralized networks 130. The initial tokens 202 may be one or more initial tokens 202 configured to indicate the entitlements 174 that a user profile or a group of user profiles request to access. The initial firewall configuration 250 may be configuration information comprising one or more of the entitlements 174 the one or more user devices 110 request to access. At the decentralized network 130, the nodes 132-140 may perform one or more token updating operations shown as updating token 260 and updating tokens 270-274 in which updated tokens are generated or minted based at least in part upon the initial firewall configuration 250 received from the initial tokens 202. In some embodiments, the decentralized network 130 transmits one or more updated tokens 204 to the token controller 162 comprising updated encrypted firewall configuration 280. Upon receiving the updated tokens 204, the token controller 162 may extract firewall configurations 104 to implement one or more firewalls 150 in the respective user devices 110. The token controller 162 may parse the updated tokens 204 to determine whether a given updated token is a group token 178 or a user token 180. In some embodiments, the token controller 162 may transmit one or more group or user tokens 250 to one or more user devices 110 in the user device group 112 based at least in part upon the firewall configurations 104 updated in the one or more updated tokens 204.

Updating A Firewall Security Configuration

In one or more embodiments, the security operations 200 comprise generating the firewall configuration 104A based at least in part upon operations performed in the decentralized network 130. The firewall configuration 104A may be one or more configuration commands to implement the firewall 150A at the user device 110A. In one or more embodiments, the server 102 monitors interactions of the user device 110A in the user device group 112, assigns at least one firewall configuration 104A to the user device 110A based at least in part upon one or more entitlements 174 corresponding to a user profile 172A associated with the user device 110A, and update the firewall configuration 104A for the user device 110A based at least in part upon changes to the one or more entitlements 174. To determine the firewall configuration 104A, the token generator 210 generates an initial token 202 representative of the one or more entitlements 174 and provides this initial token 202 to the decentralized network 130. In the decentralized network 130, the token is used to exchange the one or more entitlements 174 to one or more configuration policies and rules 196 corresponding to the entitlements 174.

In FIG. 2, updating token 260 is shown as a representation in which the node 132 forwards the initial token 202 to the node 140 if the node 132 determines that the node 140 comprises the policies and rules 196 corresponding to the initial token 202 received in accordance with a corresponding security information 198. Once an updated version of the token is created by the decentralized network 130, the token transceiver 212 receives an updated token 204 from the decentralized network 130. At this stage, the server 102 may extract firewall configuration 104 to the user device to be implemented as a firewall at the user device. An improvement provided by using tokens in the decentralized network 130 to obtain updated security information 198 is that the process of retrieving configuration policies and rules 196 may be automated and may be dynamically implemented without the intervention of a network manager while protecting the identity of the user 106 operating the user device 110A. In this regard, the security operations may update the token to fetch updates to the configuration policies and rules 196 periodically or dynamically every time the server 102 detects a change to the one or more entitlements 174 for the user device 110A.

Dynamically Aggregating Multiple Firewall Security Configurations

In one or more embodiments, the security operations 200 comprise dynamically aggregating multiple firewall configurations 104 based at least in part upon operations performed in the decentralized network 130. The firewall security configurations 104 may be configuration commands to implement firewalls 150A and 150B at the user device 110A and the user device 110B, respectively. In one or more embodiments, the server 102 monitors and aggregates multiple user tokens 180 of the user device 110A and the user device 110B in the user device group 112. Each user token 180 may be representative of any entitlements 174 associated with each user device 110 in the user device group 112. In one example, the entitlement 174A may be associated with the user profile 172A and the user token 180A of the user device 110A. In another example, the entitlement 174B may be associated with the user profile 172B and the user token 180B of the user device 110B. The user token 180A and the user token 180B may be tokens previously updated via the decentralized network 130.

In some embodiments, the token aggregator 218 identifies one or more updated tokens 204 (e.g., user token 180A and the user token 180B) in the tokens 116 that may be already prepared for the user device 110A and the user device 110B and aggregates the updated tokens 204 to create the group token 178A. In this regard, the group token 178A may be transmitted to the decentralized network 130 via the token transceiver 212 as an initial token 202 comprising a corresponding initial encrypted firewall configuration 250.

In the decentralized network 130, the token is used to exchange the one or more entitlements 174 with one or more configuration policies and rules 196 corresponding to the entitlements 174 and updated in accordance with updated security information 198. In the decentralized network 130, the updates are represented by updating token 270, updating token 272, and updating token 274. The multiple updates may occur under conditions in which the node 132 received the initial token 202 and determines that the nodes 134-138 may comprise relevant updated security information 198B-198D to update the initial token 202. In some embodiments, the node 134 may receive the initial token 202 from the node 132 and determines that the node 136 may comprise relevant updated security information 198C to provide additional updates to the initial token 202. At this point, the node 136 may receive the initial token 202 from the node 134 and determines that the node 138 may comprise relevant further updated security information 198D to provide additional updates to the initial token 202. After an updated token 204 is generated based at least in part upon the updates provided to the initial tokens 202.

Once an updated version of the token is created by the decentralized network 130, the token transceiver 212 receives an updated token 204 from the decentralized network 130. At this stage, the server 102 may extract firewall configuration 104C to the user device to be implemented as the firewall 150A at the user device 110A and the firewall 150B at the user device 110B.

In some embodiments, the firewall aggregator 216 identifies one or more firewall configurations 104 from updated tokens 204 (e.g., user token 180A and the user token 180B) in the tokens 116 that may be already prepared for the user device 110A and the user device 110B and aggregates the firewall configurations 104 to create the group firewall 230A. In this regard, the group firewall 230A may be transmitted to the user device group 112 to implement the firewall 150A and the firewall 150B at the user device 110A and the user device 110B, respectively.

An improvement provided by using tokens in the decentralized network 130 to obtain updated multiple security information 198 to be implemented at multiple user devices 110 in the user device group 112 is that multiple tokens in a group or organization (e.g., the user device group 112) may be dynamically updated to include the entitlements 174 approved for multiple user devices 110 in the group or organization. In other embodiments, the process of retrieving configuration policies and rules 196 may be automated and may be dynamically implemented without the intervention of a network manager while protecting the identity of the users operating the user device 110A and the user device 110B. In this regard, the security operations may update the token to fetch updates to the configuration policies and rules 196 periodically or dynamically every time the server 102 detects a change to the one or more entitlements 174 for the user device 110A.

Example Processes

FIGS. 3 and 4 illustrate respective example flowcharts of a process 300 and a process 400 in accordance with one or more embodiments. Modifications, additions, or omissions may be made to the processes 300 and 400. The processes 300 and 400 may comprise more, fewer, or other operations than those shown below. For example, operations may be performed in parallel or in any suitable order. While at times discussed as the server 102, processor 156, processing engine 158, the hardware accelerator 160, the token controller 162, the nodes 132-140 of the decentralized network 130, or components of any of thereof performing operations described in the operations, any suitable system or components of the security system 100 may perform one or more operations of the processes 300 and 400. For example, one or more operations of processes 300 and 400 may be implemented, at least in part, in the form of instructions 166 of FIG. 1, stored on non-transitory, tangible, machine-readable media (e.g., the server memory 164 of FIG. 1) that when run by one or more processors (e.g., the processor 156 of FIG. 1) may cause the one or more processors to perform operations described in operations 302-322 or 402-422.

Example Process to Update a Firewall Security Configuration in a Decentralized Network FIG. 3 illustrates an example flowchart of the process 300 to update firewall configurations 104 in the decentralized network 130, in accordance with one or more embodiments.

The process 300 starts at operation 302, where the server 102 receives a device profile 192 from the user device 110A. As described above, the server 102 may request the device profile 192 from the user device 110A upon determining that the user device 110A attempts to access a new entitlement 174A. At operation 304, the server 102 validates the device profile 192 against the user profile 172A. The server 102 may confirm that the validation profile 192 is associated with the user profile 172A. At operation 306, the server 102 determines at least one entitlement 174A associated with the user profile 172A.

At operation 310, the server 102 may determine whether the user device 110A is allowed to access the entitlement 174A. If the server 102 determines that the user device 110A is allowed to access the entitlement 174A (e.g., YES), then the process 300 proceeds to operation 312. If the server 102 determines that the user device 110A is not allowed to access the entitlement 174A (e.g., NO), then the process 300 proceeds to operation 320.

At operation 312, the server 102 generates the initial token 202 indicating that the device profile 172A is entitled to access the entitlement 174A. At operation 314, the server 102 transmit the initial token 202 to the decentralized network 130. The decentralized network 130 may receive the initial token 202 at a first node 132 of the multiple nodes 132-140. The first node 132 may be configured to provide a first update (i.e., represented by updating tokens 260-274) corresponding to rules and policies 196 and updated in accordance with the updated security information 198. At operation 316, the server 102 receives the updated token 204 from the decentralized network 130. At operation 318, the server 102 identifies the firewall configuration 104A in the updated token 204.

At operation 320, the server 102 identifies the firewall configuration 104A in security information 176 predefined for the user profile 172A. In this regard, the server 102 may maintain the existing firewall configuration 104B previously assigned to user device 110A. In other embodiments, the server 102 may fetch the firewall configuration 104B from the security information 176 to implement the firewall 150A at the user device 110A.

The process 300 ends at operation 322, where the server 102 transmits the firewall configuration 104A to the user device 110A to implement the firewall 150A at the user device 110A.

Example Process to Dynamically Aggregating Multiple Firewall Security Configurations in a Decentralized Network FIG. 4 illustrates an example flowchart of a process 400 to dynamically aggregate multiple firewall configurations 104 in the decentralized network 130, in accordance with one or more embodiments.

The process 400 starts at operation 402, where the server 102 identifies a first updated token (e.g., user token 180A) associated with the first user profile 172A of the user device group 112. At operation 404, where the server 102 identifies a second updated token (e.g., user token 180B) associated with the second user profile 172B of the user device group 112. At operation 406, the server 102 determine one or more entitlements 174 associated with the first user profile 172A and the second user profile 172B.

At operation 410, the server 102 may determine whether the entitlements 174 are different between the first user profile 172A and the second user profile 172B. If the server 102 determines that the entitlements 174 are different (e.g., a first entitlement 174A and a second entitlement 174B) between the first user profile 172A and the second user profile 172B (e.g., YES), then the process 400 proceeds to operation 412. If the server 102 determines that the entitlements are the same (e.g., not different) (e.g., the first entitlement 174A) between the first user profile 172A and the second user profile 172B (e.g., NO), then the process 400 proceeds to operation 420.

At operation 412, the server 102 generates an initial token 202 indicating that the user devices 110 in the user device group 112 are entitled to access the one or more entitlements 174. The decentralized network 130 may receive the initial token 202 at a first node 132 of the multiple nodes 132-140. The first node 132 may be configured to provide a first update (i.e., represented by updating tokens 260-274) corresponding to rules and policies 196 and updated in accordance with the updated security information 198. At operation 414, the server 102 transmit the initial token to the decentralized network 130. At operation 416, the server 102 receives an updated token 204 from the decentralized network 130. At operation 418, the server 102 identifies one or more firewall configurations 104A-104C in the updated token 204.

At operation 420, the server 102 identifies the firewall configuration 104C for the first user profile 172A corresponding to the user device 110A and the second user profile 172B corresponding to the user device 110B in the user device group 112. In this regard, the server 102 may maintain the existing firewall configuration 104C previously assigned to the user device 110A or the user device 110B to be used in all user devices 110 in the user device group 112.

The process 400 ends at operation 422, where the server 102 transmits the firewall configurations 104A-104C to the user devices 110A and 110B in the user device group 112 to implement respective firewalls 150A and 150B at the user devices 110A and 110B.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
a memory, configured to store:
one or more user profiles associated with one or more user groups, each user profile comprising one or more entitlements; and
security information comprising one or more firewall configurations, each firewall configuration being configured to enable each user profile to access the one or more entitlements;
a processor communicatively coupled to the memory and configured to:
receive a first device profile from a first user device;
validate the first device profile against a first user profile of the one or more user profiles;
determine a first entitlement of the one or more entitlements associated with the first user profile;
generate a first initial token indicating that the first device profile is entitled to access the first entitlement;
transmit the first initial token to a decentralized network;
receive a first updated token from the decentralized network, wherein:
the first updated token indicates a first firewall configuration based at least in part upon the first initial token; and
the first firewall configuration is configured to enable the first user device to access the first entitlement; and
transmit the first firewall configuration to the first user device to implement a first firewall at the first user device.

2. The apparatus of claim 1, wherein the processor is further configured to:
receive a second device profile from a second user device;
validate the second device profile against a second user profile of the one or more user profiles;
determine a second entitlement of the one or more entitlements associated with the second user profile;
generate a second initial token indicating that the second device profile is entitled to access the second entitlement;
transmit the second initial token to the decentralized network;
receive a second updated token from the decentralized network, wherein:
the second updated token indicates a second firewall configuration based at least in part upon the second initial token; and
the second firewall configuration is configured to enable the second user device to access the second entitlement; and transmit the second firewall configuration to the second user device to implement a second firewall at the second user device.

3. The apparatus of claim 1, wherein the processor is further configured to:
in determining the first entitlement of the one or more entitlements associated with the first user profile, determine whether the first user profile is associated with a first user group of the one or more user groups or a second user group of the one or more user groups, wherein:
the first user group is associated with a first plurality of rules and policies in the decentralized network; and
the second user group is associated with a second plurality of rules and policies in the decentralized network;
in response to determining that the first user profile is associated with the first user group, generate the first initial token indicating that the first device profile is entitled to access the first entitlement in accordance the first plurality of rules and policies;
in response to determining that the first user profile is associated with the second user group, generate the first initial token indicating that the first device profile is entitled to access the first entitlement in accordance with the second plurality of rules and policies; and
transmit the first initial token to the first node in the decentralized network.

4. The apparatus of claim 1, wherein the processor is further configured to:
in conjunction with receiving the first device profile from the first user device, receive a first request for the first firewall configuration from the first user device.

5. The apparatus of claim 1, wherein the processor is further configured to:
in conjunction with receiving the first device profile from the first user device, monitor first communication information associated with the first user device;
determine whether the communication information comprises a first attempt at accessing the first entitlement; and
in response to determining that the communication information comprises the first attempt, indicate to the first user device to transmit the first device profile to the apparatus.

6. The apparatus of claim 5, wherein the processor is further configured to:
dynamically monitor second communication information associated with the first user device;
determine whether the communication information comprises a second attempt at accessing a second entitlement;
in response to determining that the communication information comprises the second attempt, generate a second initial token indicating that the first device profile is entitled to access the first entitlement and the second entitlement;
transmit the second initial token to the decentralized network;
receive a second updated token from the decentralized network, wherein:
the second updated token indicates a second firewall configuration based at least in part upon the second initial token; and
the second firewall configuration is configured to enable the first user device to access the first entitlement and the second entitlement; and
transmit the second firewall configuration to the first user device to implement a second firewall at the first user device.

7. The apparatus of claim 5, wherein the processor is further configured to:
periodically monitor second communication information associated with the first user device;
determine whether the communication information comprises a second attempt at accessing a second entitlement;
in response to determining that the communication information comprises the second attempt, generate a second initial token indicating that the first device profile is entitled to access the first entitlement and the second entitlement;
transmit the second initial token to the decentralized network;
receive a second updated token from the decentralized network, wherein:
the first updated token indicates a second firewall configuration based at least in part upon the second initial token; and
the second firewall configuration is configured to enable the first user device to access the first entitlement and the second entitlement; and
transmit the second firewall configuration to the first user device to implement a second firewall at the first user device.

8. A system, comprising:
a decentralized network comprising:
a first node configured to:
receive a first initial token comprising a first initial encrypted firewall configuration and a second initial token comprising a second initial encrypted firewall configuration; and
provide a first updated token comprising a first updated encrypted firewall configuration based at least in part upon the first initial token in accordance with a first security information; and
a second node configured to:
receive the second initial token from the first node; and
provide a second updated token comprising a second updated encrypted firewall configuration based at least in part upon the second initial token in accordance with a second security information; and
a server communicatively coupled to the decentralized network and configured to:
receive a first device profile from a first user device;
validate the first device profile against a first user profile of one or more user profiles, the first user profile being associated with a first user group and comprising a first entitlement;
determine the first entitlement associated with the first user profile;
generate the first initial token indicating that the first device profile is entitled to access the first entitlement;
transmit the first initial token to the decentralized network;
receive the first updated token from the decentralized network, wherein:
the first updated token indicates a first firewall configuration based at least in part upon the first initial token; and the first firewall configuration is configured to enable the first user device to access the first entitlement; and transmit the first firewall configuration to the first user device to implement a first firewall at the first user device.

9. The system of claim 8, wherein the server is further configured to:

receive a second device profile from a second user device;

validate the second device profile against a second user profile of the one or more user profiles, the second user profile being associated with a second user group and comprising a second entitlement;

determine the second entitlement associated with the second user profile;

generate the second initial token indicating that the second device profile is entitled to access the second entitlement;

transmit the second initial token to the decentralized network;

receive the second updated token from the decentralized network, wherein:
the second updated token indicates a second firewall configuration based at least in part upon the second initial token; and
the second firewall configuration is configured to enable the second user device to access the second entitlement; and transmit the second firewall configuration to the second user device to implement a second firewall at the second user device.

10. The system of claim 9, wherein the server is further configured to:

in determining the first entitlement associated with the first user profile, determine whether the first user profile is associated with the first user group or the second user group, wherein:
the first user group is associated with a first plurality of rules and policies in the decentralized network; and
the second user group is associated with a second plurality of rules and policies in the decentralized network;

in response to determining that the first user profile is associated with the first user group, generate the first initial token indicating that the first device profile is entitled to access the first entitlement in accordance the first plurality of rules and policies;

in determining the second entitlement associated with the second user profile, determine whether the second user profile is associated with the first user group or the second user group;

in response to determining that the second user profile is associated with the second user group, generate the second initial token indicating that the second device profile is entitled to access the second entitlement in accordance with the second plurality of rules and policies; and transmit the first initial token and the second initial token to the first node in the decentralized network.

11. The system of claim 8, wherein the server is further configured to:

in conjunction with receiving the first device profile from the first user device, receive a first request for the first firewall configuration from the first user device.

12. The system of claim 8, wherein the server is further configured to:

in conjunction with receiving the first device profile from the first user device, monitor first communication information associated with the first user device;

determine whether the communication information comprises a first attempt at accessing the first entitlement; and in response to determining that the communication information comprises the first attempt, indicate to the first user device to transmit the first device profile to the apparatus.

13. The system of claim 12, wherein the server is further configured to:

dynamically monitor second communication information associated with the first user device;

determine whether the communication information comprises a second attempt at accessing a second entitlement;

in response to determining that the communication information comprises the second attempt, generate a third initial token indicating that the first device profile is entitled to access the first entitlement and the second entitlement;

transmit the third initial token to the decentralized network;

receive a third updated token from the decentralized network, wherein:
the third updated token indicates a third firewall configuration based at least in part upon the third initial token; and
the third firewall configuration is configured to enable the first user device to access the first entitlement and the second entitlement; and transmit the third firewall configuration to the first user device to implement a third firewall at the first user device.

14. The system of claim 12, wherein the server is further configured to:

periodically monitor second communication information associated with the first user device;

determine whether the communication information comprises a second attempt at accessing a second entitlement;

in response to determining that the communication information comprises the second attempt, generate a third initial token indicating that the first device profile is entitled to access the first entitlement and the second entitlement;

transmit the third initial token to the decentralized network;

receive a third updated token from the decentralized network, wherein:
the third updated token indicates a third firewall configuration based at least in part upon the third initial token; and
the third firewall configuration is configured to enable the first user device to access the first entitlement and the second entitlement; and transmit the third firewall configuration to the first user device to implement a third firewall at the first user device.

15. A method, comprising:

receiving a first device profile from a first user device;

validating the first device profile against a first user profile of one or more user profiles, the first user profile being associated with a first user group and comprising a first entitlement;

determining the first entitlement associated with the first user profile;

generating a first initial token indicating that the first device profile is entitled to access the first entitlement;

transmitting the first initial token to a decentralized network;

receiving the first updated token from the decentralized network, wherein:
- the first updated token indicates a first firewall configuration based at least in part upon the first initial token; and
- the first firewall configuration is configured to enable the first user device to access the first entitlement; and transmitting the first firewall configuration to the first user device to implement a first firewall at the first user device.

16. The method of claim 15, further comprising:

receiving a second device profile from a second user device;

validating the second device profile against a second user profile of the one or more user profiles, the second user profile being associated with a second user group and comprising a second entitlement;

determining a second entitlement associated with the second user profile;

generating a second initial token indicating that the second device profile is entitled to access the second entitlement;

transmitting the second initial token to the decentralized network;

receiving the second updated token from the decentralized network, wherein:
- the second updated token indicates a second firewall configuration based at least in part upon the second initial token; and
- the second firewall configuration is configured to enable the second user device to access the second entitlement; and transmitting the second firewall configuration to the second user device to implement a second firewall at the second user device.

17. The method of claim 16, further comprising:

in determining the first entitlement associated with the first user profile, determining whether the first user profile is associated with the first user group or the second user group, wherein:
- the first user group is associated with a first plurality of rules and policies in the decentralized network; and
- the second user group is associated with a second plurality of rules and policies in the decentralized network;

in response to determining that the first user profile is associated with the first user group, generating the first initial token indicating that the first device profile is entitled to access the first entitlement in accordance the first plurality of rules and policies;

in determining the second entitlement associated with the second user profile, determining whether the second user profile is associated with the first user group or the second user group;

in response to determining that the second user profile is associated with the second user group, generating the second initial token indicating that the second device profile is entitled to access the second entitlement in accordance with the second plurality of rules and policies; and transmitting the first initial token and the second initial token to the first node in the decentralized network.

18. The method of claim 15, further comprising:

in conjunction with receiving the first device profile from the first user device, receiving a first request for the first firewall configuration from the first user device.

19. The method of claim 15, further comprising:

in conjunction with receiving the first device profile from the first user device, monitoring first communication information associated with the first user device;

determining whether the communication information comprises a first attempt at accessing the first entitlement; and in response to determining that the communication information comprises the first attempt, indicating to the first user device to transmit the first device profile to the apparatus.

20. The method of claim 19, further comprising:

dynamically monitoring second communication information associated with the first user device;

determining whether the communication information comprises a second attempt at accessing a second entitlement;

in response to determining that the communication information comprises the second attempt, generating a third initial token indicating that the first device profile is entitled to access the first entitlement and the second entitlement;

transmitting the third initial token to the decentralized network;

receiving a third updated token from the decentralized network, wherein:
- the third updated token indicates a third firewall configuration based at least in part upon the third initial token; and
- the third firewall configuration is configured to enable the first user device to access the first entitlement and the second entitlement; and transmitting the third firewall configuration to the first user device to implement a third firewall at the first user device.

* * * * *